US012787995B2

(12) United States Patent
Cahoon et al.

(10) Patent No.: US 12,787,995 B2
(45) Date of Patent: Nov. 10, 2026

(54) HYDROFOIL FISHING LURE APPARATUS

(71) Applicants: Bradley David Cahoon, Coronado, CA (US); Adam Spencer Garson, Coronado, CA (US); Peter John Gutierrez, III, San Diego, CA (US)

(72) Inventors: Bradley David Cahoon, Coronado, CA (US); Adam Spencer Garson, Coronado, CA (US); Peter John Gutierrez, III, San Diego, CA (US)

( * ) Notice: Subject to any disclaimer, the term of this patent is extended or adjusted under 35 U.S.C. 154(b) by 0 days.

(21) Appl. No.: 18/244,240

(22) Filed: Sep. 9, 2023

(65) Prior Publication Data

US 2024/0099285 A1 Mar. 28, 2024

Related U.S. Application Data

(62) Division of application No. 17/720,044, filed on Apr. 13, 2022, now Pat. No. 11,751,551.

(60) Provisional application No. 63/175,397, filed on Apr. 15, 2021.

(51) Int. Cl.

| | |
|---|---|
| ***A01K 91/08*** | (2006.01) |
| ***A01K 85/00*** | (2006.01) |
| ***A01K 85/16*** | (2006.01) |

(52) U.S. Cl.
CPC .......... *A01K 91/08* (2013.01); *A01K 85/1817* (2022.02); *A01K 85/1841* (2022.02); *A01K 85/16* (2013.01)

(58) Field of Classification Search
CPC ................ A01K 91/08; A01K 85/1841; A01K 85/1817; A01K 85/1813; A01K 85/1807; A01K 85/1803; A01K 85/16; A01K 85/18; A01K 85/1871; A01K 85/012; A01K 85/00; A01K 73/04; A01K 73/045; A01K 73/05; A63H 3/26; A63H 23/00; A63H 23/02;
(Continued)

(56) References Cited

U.S. PATENT DOCUMENTS 756,527 A * 4/1904 Reynolds ............... A01K 85/00 43/42.13
1,188,583 A * 6/1916 Townsend .............. A01K 85/16 43/42.22
(Continued)

FOREIGN PATENT DOCUMENTS

DE 507943 C * 9/1930
DE 1219278 B * 6/1966
(Continued)

*Primary Examiner* — Darren W Ark
(74) *Attorney, Agent, or Firm* — Garson & Gutierrez, PC

(57) ABSTRACT

Hydrofoil fishing lure apparatus for use with trolling techniques behind a boat. In one embodiment, the hydrofoil fishing lure apparatus includes an artificial lure having a body. A hydrofoil that includes a strut and a lifting surface, with the strut for the hydrofoil being attached to the body of the artificial lure is also included. In some variants, the artificial lure may be modeled after flying fish species. Wing retraction elements may be utilized on the hydrofoil to retract or expand the wings of the flying fish to provide for a more natural presentation. Other variants described herein include fishing lure platforms that include a hydrofoil that allow for the mounting of frozen, live, or other types of artificial baits on the hydrofoil itself.

17 Claims, 3 Drawing Sheets

(58) Field of Classification Search

CPC .......... A63H 23/10; B63B 1/24; B63B 32/60; B63B 34/40

USPC ........... 43/43.13, 43.12, 42.22, 42.47, 42.03, 43/42.02, 42.11, 42.13, 42.26, 42.27, 43/42.33, 9.7; 446/158, 160, 156, 157; 114/39.15, 39.24, 55.54, 274; 441/65, 68, 441/79; D22/125, 126, 130–133

See application file for complete search history.

(56) References Cited

U.S. PATENT DOCUMENTS

| | | | | | |
|---|---|---|---|---|---|
| 1,361,067 | A | * | 12/1920 | Jordan | A01K 85/16 43/42.22 |
| 1,361,602 | A | * | 12/1920 | Marks | A01K 91/02 43/43.13 |
| 1,521,090 | A | * | 12/1924 | Goble | A01K 85/18 43/42.49 |
| 1,606,240 | A | * | 11/1926 | Klaserner | A01K 93/00 43/43.13 |
| 1,857,312 | A | * | 5/1932 | Kuehn | A01K 85/18 43/42.36 |
| 1,923,623 | A | * | 8/1933 | Hoage | A01K 85/16 43/42.23 |
| 2,062,718 | A | * | 12/1936 | Kallberg | A01K 91/08 43/43.13 |
| D149,238 | S | * | 4/1948 | Vaars | D22/126 |
| 2,472,505 | A | * | 6/1949 | Yocam | A01K 85/16 74/54 |
| 2,484,162 | A | * | 10/1949 | Golembeski | A01K 85/16 43/42.22 |
| 2,545,185 | A | * | 3/1951 | Winslow | A01K 91/08 43/42.22 |
| 2,557,516 | A | * | 6/1951 | Schipper | A01K 85/16 43/42.22 |
| 2,563,386 | A | * | 8/1951 | Wight, Jr. | A01K 85/12 43/42.22 |
| 2,594,981 | A | * | 4/1952 | Ohlund | A01K 85/12 43/42.22 |
| 2,608,790 | A | * | 9/1952 | Mcfarland | A01K 85/12 43/42.22 |
| 2,679,227 | A | * | 5/1954 | Symonds | B63G 8/18 43/42.22 |
| 2,696,061 | A | * | 12/1954 | Swenson | A01K 85/12 43/42.22 |
| 2,719,377 | A | * | 10/1955 | Bennett | A01K 85/16 43/42.47 |
| 2,760,294 | A | * | 8/1956 | Morrill, Jr. | A01K 85/16 43/42.27 |
| 2,787,077 | A | * | 4/1957 | Keiter | A01K 95/00 43/43.13 |
| 2,825,994 | A | * | 3/1958 | Bruhn | A01K 91/08 43/43.13 |
| 2,843,966 | A | * | 7/1958 | Ingram | A01K 91/08 43/42.23 |
| 2,858,788 | A | * | 11/1958 | Lyman | B63B 1/24 114/280 |
| 2,862,326 | A | * | 12/1958 | Minera | A01K 91/06 43/43.13 |
| 2,883,786 | A | * | 4/1959 | Smith | A01K 85/16 43/42.22 |
| 2,883,787 | A | * | 4/1959 | Dahl | A01K 85/16 43/42.22 |
| 2,891,345 | A | * | 6/1959 | Uhlen | A01K 91/08 43/43.13 |
| 2,923,085 | A | * | 2/1960 | Dahl | A01K 91/08 43/43.13 |
| 2,924,907 | A | * | 2/1960 | Hamilton | A01K 91/08 43/42.22 |
| 2,933,848 | A | * | 4/1960 | Tollefson | A01K 91/08 43/43.13 |
| 2,940,207 | A | * | 6/1960 | Scott | A01K 91/08 43/44.96 |
| D189,008 | S | * | 10/1960 | Foster | D21/810 |
| 2,960,960 | A | * | 11/1960 | Fehlner | B63B 21/66 367/17 |
| 2,967,503 | A | * | 1/1961 | Unger | B63B 1/22 114/280 |
| 2,977,709 | A | * | 4/1961 | Keiter | A01K 91/08 43/43.13 |
| 2,991,747 | A | * | 7/1961 | Bader | B63B 1/285 114/282 |
| 3,023,537 | A | * | 3/1962 | Madson | A01K 95/00 43/42.22 |
| RE25,165 | E | * | 5/1962 | Pulsifier | A01K 73/025 43/9.7 |
| 3,032,910 | A | * | 5/1962 | Crossan | A01K 85/12 43/42.22 |
| 3,044,208 | A | * | 7/1962 | Minera | A01K 91/06 43/43.13 |
| 3,134,189 | A | * | 5/1964 | Hubbart | A01K 91/08 43/43.13 |
| 3,181,266 | A | * | 5/1965 | Lenfvenius | A01K 91/06 43/43.13 |
| 3,190,025 | A | * | 6/1965 | Burney | A01K 73/045 43/9.7 |
| 3,208,422 | A | * | 9/1965 | Schopmeyer | B63B 1/24 114/281 |
| 3,318,038 | A | * | 5/1967 | Delsol | A01K 73/045 43/43.13 |
| 3,373,710 | A | * | 3/1968 | Steinberg | B63B 1/286 114/280 |
| 3,401,483 | A | * | 9/1968 | Bellah | A01K 93/00 43/42.47 |
| 3,462,871 | A | * | 8/1969 | McVay | A01K 85/16 43/42.47 |
| 3,464,142 | A | * | 9/1969 | Hubbart | F16B 45/036 43/42.22 |
| 3,626,628 | A | * | 12/1971 | Weimer | A01K 85/16 43/42.22 |
| 3,760,762 | A | * | 9/1973 | Spongberg | A01K 91/08 43/43.13 |
| 3,818,624 | A | * | 6/1974 | Duffy | A01K 91/08 43/43.13 |
| 3,858,344 | A | * | 1/1975 | Watts | A01K 85/12 43/42.22 |
| 3,898,758 | A | * | 8/1975 | Swanningson | A01K 91/06 43/42.49 |
| 3,898,759 | A | * | 8/1975 | Jensen | A01K 91/08 43/43.13 |
| 3,973,350 | A | * | 8/1976 | England | A01K 91/20 43/42.39 |
| 3,999,496 | A | * | 12/1976 | Mirande | B63H 25/38 114/280 |
| D243,954 | S | * | 4/1977 | Raquel | D22/133 |
| 4,028,839 | A | * | 6/1977 | Stubblefield | G07F 17/00 43/43.13 |
| 4,161,841 | A | * | 7/1979 | Holstein | A01K 91/08 43/42.23 |
| 4,212,127 | A | * | 7/1980 | Daniels | A01K 91/08 43/43.12 |
| 4,232,469 | A | * | 11/1980 | Shiverdecker | A01K 85/16 43/42.35 |
| 4,254,573 | A | * | 3/1981 | Mastropaolo | A01K 91/08 43/43.13 |
| 4,380,131 | A | * | 4/1983 | Lazan, Jr. | A01K 91/10 43/43.13 |
| 4,486,970 | A | * | 12/1984 | Larson | A01K 91/08 43/43.13 |
| 4,581,841 | A | * | 4/1986 | Gish | A01K 85/16 43/42.03 |
| 4,745,702 | A | * | 5/1988 | Koch | A01K 91/08 43/43.13 |
| 4,768,988 | A | * | 9/1988 | Rutter | A63H 23/10 446/153 |
| 4,858,370 | A | * | 8/1989 | Ryder | A01K 85/005 43/42.26 |
| D305,352 | S | * | 1/1990 | Skille | D21/770 |

(56) References Cited

U.S. PATENT DOCUMENTS

| | | | | |
|---|---|---|---|---|
| 4,894,946 | A * | 1/1990 | Fukushima | A01K 73/045 43/9.7 |
| 4,923,427 | A * | 5/1990 | Roland | A63H 13/04 446/160 |
| 5,003,723 | A * | 4/1991 | Dutcher | A01K 85/14 43/42.27 |
| 5,018,296 | A * | 5/1991 | Putz, II | A01K 91/08 43/43.12 |
| 5,088,226 | A * | 2/1992 | Bazinet | A01K 85/16 43/42.47 |
| D324,706 | S * | 3/1992 | Gibson | D11/160 |
| 5,150,539 | A * | 9/1992 | Sorola | A01K 91/03 43/43.12 |
| 5,185,951 | A * | 2/1993 | Hemmerle | A01K 91/08 43/43.13 |
| 5,193,299 | A * | 3/1993 | Correll | A01K 85/00 43/42.47 |
| 5,197,221 | A * | 3/1993 | Kresl | A01K 85/16 43/42.47 |
| 5,249,998 | A * | 10/1993 | Woolley | B63B 34/40 114/274 |
| 5,255,467 | A * | 10/1993 | Haskell | A01K 91/08 43/42.22 |
| 5,311,832 | A * | 5/1994 | Payne | B63B 1/285 114/274 |
| 5,329,870 | A * | 7/1994 | Cook | B63B 1/28 114/280 |
| 5,355,615 | A * | 10/1994 | Spickelmire | A01K 91/08 43/43.13 |
| 5,357,892 | A * | 10/1994 | Vatne | A01K 73/045 114/244 |
| 5,448,963 | A * | 9/1995 | Gallington | B63B 1/283 114/274 |
| 5,471,942 | A * | 12/1995 | Miller | B63B 32/64 114/274 |
| 5,544,607 | A * | 8/1996 | Rorabaugh | B60F 3/0046 114/274 |
| 5,611,167 | A * | 3/1997 | Mills | A01K 91/08 43/43.1 |
| 5,622,130 | A * | 4/1997 | Calderon | B63B 41/00 114/39.21 |
| 5,653,189 | A * | 8/1997 | Payne | B63B 1/246 114/274 |
| 5,673,645 | A * | 10/1997 | Bandyopadhyay | B63H 1/36 114/274 |
| 5,809,926 | A * | 9/1998 | Kelsey | B63B 32/64 114/274 |
| 5,860,384 | A * | 1/1999 | Castillo | B63B 1/40 114/274 |
| 5,867,932 | A * | 2/1999 | Reiger | A01K 91/08 43/43.1 |
| 5,937,569 | A * | 8/1999 | Solheim | A01K 85/16 43/42.49 |
| 5,947,788 | A * | 9/1999 | Derrah | A63H 23/10 446/154 |
| 6,019,059 | A * | 2/2000 | Kelsey | B63B 32/64 114/274 |
| D424,569 | S * | 5/2000 | Augusta | D21/643 |
| 6,055,765 | A * | 5/2000 | Ruppa | A01K 91/08 43/43.13 |
| 6,061,949 | A * | 5/2000 | Fairchild | A01K 85/16 43/42.26 |
| 6,131,327 | A * | 10/2000 | Larsen | A01K 73/045 43/9.7 |
| 6,183,333 | B1 * | 2/2001 | Hall | A63H 13/045 441/74 |
| 6,219,955 | B1 * | 4/2001 | Hnizdor | A01K 85/08 43/42.26 |
| 6,237,277 | B1 * | 5/2001 | Hildman | A01K 83/00 43/43.16 |
| 6,305,308 | B1 * | 10/2001 | Kristiansen | A01K 73/045 114/244 |
| 6,397,771 | B1 * | 6/2002 | Levi | B63B 41/00 114/140 |
| 6,481,149 | B1 * | 11/2002 | Hall, IV | A01K 83/00 43/43.16 |
| 6,484,434 | B1 * | 11/2002 | Elges | A01K 85/16 43/42.47 |
| 6,658,784 | B1 * | 12/2003 | Mastropaolo | A01K 91/08 43/42.22 |
| 6,804,910 | B1 * | 10/2004 | Sharp | A01K 85/16 43/42.22 |
| 6,886,481 | B1 * | 5/2005 | Lord | B63B 1/28 114/140 |
| 6,901,873 | B1 * | 6/2005 | Lang | B63B 1/288 114/274 |
| 7,065,918 | B2 * | 6/2006 | Leone | A01K 91/04 43/43.1 |
| 7,144,285 | B1 * | 12/2006 | Hendricks | B63B 1/286 441/74 |
| 7,232,355 | B2 * | 6/2007 | Woolley | B63B 34/40 441/72 |
| 7,322,151 | B2 * | 1/2008 | Guigo | A01K 85/16 43/42.26 |
| 7,363,872 | B1 * | 4/2008 | Binger | B63B 1/248 114/274 |
| 7,367,153 | B1 * | 5/2008 | Koch, III | A01K 73/045 43/43.13 |
| 7,380,366 | B1 * | 6/2008 | Barrow | A01K 91/08 43/42.22 |
| 7,406,796 | B1 * | 8/2008 | Koch | A01K 91/08 43/43.12 |
| 7,497,045 | B1 * | 3/2009 | Crowe | A01K 95/00 43/42.22 |
| 7,513,205 | B2 * | 4/2009 | Morris, III | B63B 41/00 114/140 |
| 7,520,088 | B2 * | 4/2009 | Even | A01K 91/08 43/43.13 |
| 7,578,092 | B2 * | 8/2009 | Spickelmire | A01K 91/08 43/43.13 |
| 8,051,793 | B2 * | 11/2011 | Ulgen | B63B 1/30 114/274 |
| 8,813,417 | B2 * | 8/2014 | Bland | A63H 23/10 43/42.49 |
| 8,857,363 | B2 * | 10/2014 | Sahlin | B63B 1/286 114/274 |
| 8,979,604 | B1 * | 3/2015 | Woolley | B63B 34/45 114/274 |
| 9,056,654 | B1 * | 6/2015 | Fraser | B63B 32/60 |
| 9,474,983 | B2 * | 10/2016 | Hohns | A63H 3/26 |
| 9,554,566 | B2 * | 1/2017 | Majszak | A01K 91/08 |
| 9,586,651 | B2 * | 3/2017 | Modica | B63B 32/66 |
| 9,615,561 | B2 * | 4/2017 | Osborn | A01K 91/08 |
| 9,789,935 | B1 * | 10/2017 | Aguera | B63B 32/64 |
| 9,930,876 | B2 * | 4/2018 | Solberg | A01K 93/00 |
| 10,118,668 | B2 * | 11/2018 | Dombois | B63B 1/242 |
| 10,160,525 | B2 * | 12/2018 | Aguera | B63B 32/66 |
| 10,285,390 | B1 * | 5/2019 | Bazinet | A01K 85/1863 |
| 10,358,193 | B2 * | 7/2019 | Lobisser | B63B 32/64 |
| 10,368,533 | B1 * | 8/2019 | Greenberg | A01K 91/08 |
| 10,525,369 | B2 * | 1/2020 | Hohns | A63H 3/26 |
| 10,542,829 | B2 * | 1/2020 | Martino | A47F 7/02 |
| D881,333 | S * | 4/2020 | McKeral, Jr. | D22/133 |
| 10,759,503 | B2 * | 9/2020 | Aguera | B63B 32/64 |
| 10,842,140 | B1 * | 11/2020 | Watson | A01K 85/18 |
| 10,888,178 | B2 * | 1/2021 | Martino | B63H 16/18 |
| 10,988,216 | B1 * | 4/2021 | Murphy | B63B 32/50 |
| 11,084,556 | B1 * | 8/2021 | Montague | B63H 21/17 |
| 11,117,642 | B2 * | 9/2021 | Hofbauer | B63B 1/286 |
| 11,130,549 | B2 * | 9/2021 | Dombois | B63B 1/248 |
| 11,388,895 | B2 * | 7/2022 | Vergara | A01K 91/08 |
| 11,751,551 | B2 * | 9/2023 | Cahoon | A01K 85/1841 43/43.13 |
| 2004/0121700 | A1 * | 6/2004 | Derrah | A63H 13/045 446/154 |
| 2006/0191458 | A1 * | 8/2006 | George | B63H 19/04 114/253 |
| 2006/0288631 | A1 * | 12/2006 | Guigo | A01K 85/16 43/42.26 |

(56) References Cited

U.S. PATENT DOCUMENTS

| | | | | |
|---|---|---|---|---|
| 2007/0006518 | A1* | 1/2007 | Claverie, III | A01K 85/16 43/42.22 |
| 2007/0028505 | A1* | 2/2007 | Van Wyk | A01K 85/16 43/42.32 |
| 2008/0022580 | A1* | 1/2008 | Moulder | A01K 91/08 43/43.12 |
| 2008/0060252 | A1* | 3/2008 | Doss | A01K 95/00 43/44.87 |
| 2008/0083153 | A1* | 4/2008 | Ford | A01K 91/08 43/42.22 |
| 2008/0104877 | A1* | 5/2008 | Claverie, III | A01K 85/00 43/42.09 |
| 2008/0148623 | A1* | 6/2008 | Uhrig | A01K 85/00 43/42.42 |
| 2008/0202016 | A1* | 8/2008 | Robertson | A01K 85/08 43/42.35 |
| 2008/0305698 | A1* | 12/2008 | Rosiello | B63B 34/40 441/79 |
| 2008/0307691 | A1* | 12/2008 | Guonason | A01K 73/045 43/9.7 |
| 2010/0000461 | A1* | 1/2010 | Waite | B63B 1/248 114/274 |
| 2010/0089303 | A1* | 4/2010 | Sioutis | B63B 1/248 114/274 |
| 2010/0175305 | A1* | 7/2010 | Heikkila | A01K 85/16 43/42.22 |
| 2010/0275501 | A1* | 11/2010 | Uhland | A01K 91/03 43/43.13 |
| 2011/0258905 | A1* | 10/2011 | Pennaz | A01K 85/18 43/42.31 |
| 2012/0186507 | A1* | 7/2012 | Nock | B63G 8/42 114/274 |
| 2014/0000147 | A1* | 1/2014 | Bland | A01K 91/08 43/4.5 |
| 2014/0202061 | A1* | 7/2014 | Josafatsson | G01V 1/3826 114/244 |
| 2015/0079873 | A1* | 3/2015 | Hohns | A63H 3/26 446/160 |
| 2015/0104985 | A1* | 4/2015 | Langelaan | B63H 1/16 441/74 |
| 2015/0208626 | A1* | 7/2015 | Coniglio | A01K 85/16 43/42.24 |
| 2015/0217835 | A1* | 8/2015 | Gasper | B63B 34/40 114/280 |
| 2015/0272094 | A1* | 10/2015 | Pearlman | A01K 73/045 43/9.1 |
| 2016/0199748 | A1* | 7/2016 | Hohns | A63H 23/02 446/160 |
| 2017/0035037 | A1* | 2/2017 | Ayers, Jr. | A01K 91/08 |
| 2017/0280693 | A1* | 10/2017 | Lehl | A01K 97/00 |
| 2018/0014517 | A1* | 1/2018 | Coletti | A01K 85/16 |
| 2018/0153147 | A1* | 6/2018 | Laabs | A01K 85/16 |
| 2018/0228135 | A1* | 8/2018 | Josafatsson | A01K 73/045 |
| 2019/0038986 | A1* | 2/2019 | Hohns | A63H 3/26 |
| 2019/0135378 | A1* | 5/2019 | Tian | B63B 32/10 |
| 2019/0281802 | A1* | 9/2019 | Cherry | A01K 91/047 |
| 2020/0121098 | A1* | 4/2020 | Martino | A63H 18/04 |
| 2020/0281178 | A1* | 9/2020 | Breunig | A01K 91/08 |
| 2020/0331562 | A1* | 10/2020 | Dombois | B63B 1/286 |
| 2021/0076651 | A1* | 3/2021 | Johnson | A01K 85/14 |
| 2021/0107602 | A1* | 4/2021 | Karr | B60L 50/60 |
| 2021/0169057 | A1* | 6/2021 | Winger | A01K 73/045 |
| 2021/0368760 | A1* | 12/2021 | Greenberg | A01K 91/053 |
| 2022/0046906 | A1* | 2/2022 | Moorhead | A01K 85/1817 |

FOREIGN PATENT DOCUMENTS

| | | | | | |
|---|---|---|---|---|---|
| DE | 9215387 | U1 | * | 2/1993 | |
| EP | 1112685 | A1 | * | 7/2001 | A01K 85/16 |
| EP | 1541020 | A1 | * | 6/2005 | A01K 83/06 |
| EP | 3646723 | A4 | * | 11/2020 | A01K 85/14 |
| FR | 997580 | A | * | 1/1952 | |
| JP | 3209548 | U | * | 3/2017 | |
| JP | 2020141699 | A | * | 9/2020 | |
| KR | 20010054091 | A | * | 7/2001 | |
| WO | WO-02056671 | A2 | * | 7/2002 | A01K 91/08 |
| WO | WO-2008016451 | A2 | * | 2/2008 | A01K 91/08 |
| WO | WO-2013173182 | A1 | * | 11/2013 | A63H 23/02 |
| WO | WO-2017161111 | A1 | * | 9/2017 | |

* cited by examiner

HYDROFOIL FISHING LURE APPARATUS

PRIORITY

This application is a divisional of, and claims the benefit of priority to, U.S. patent application Ser. No. 17/720,044 filed Apr. 13, 2022, of the same title, now U.S. Pat. No. 11,751,551, which claims the benefit of priority to U.S. Provisional Patent Application Ser. No. 63/175,397 filed Apr. 15, 2021, of the same title, the contents of each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Technological Field

The present disclosure relates generally to hydrofoil fishing lure apparatus for attracting a wide variety of pelagic fish such as, for example, various species of tuna, sailfish, dorado, wahoo as well as other types of gamefish.

2. Description of Related Technology

The evolution of sport fishing has led to an ever-evolving range of techniques and devices for attracting a wide variety of sport fishing species. One common method is a technique known as trolling. Trolling involves the use of one or more fishing lines that are baited with artificial lures or even bait fish that are then drawn through the water through use of a boat, often at slow speeds. Trolling can be a very effective technique for catching a wide variety of different species of fish; however, some species or members of a particular species can be wary of the fishing line resulting in fewer strikes on the bait and fewer caught fish. To combat this so-called line shyness, or to offer a different presentation to the targeted species, fisherman have changed strategies and now more often utilize a technique known as kite fishing.

As the name implies, kite fishing involves the use of a kite that is flown out over a body of water. A drop line is attached to a lure or bait so that the fishing line is elevated above the water line. The lure or bait is then trolled at or near the surface of the water. Although kite fishing has proven to be an effective fishing technique due to, inter alia, the ability to attract line-shy fish, it does have its drawbacks. For example, different types of kites must be chosen based on the environmental conditions that are present. In other words, one kite may have to be utilized in windy conditions, while another type of kite may have to be utilized in calmer less windy conditions. In addition, the launching of the kite can be difficult and frustrating due to, among other things, the presence of a downdraft over the cabin of the boat which partially blocks the wind and tends to force the kite towards the water during launch. As but another drawback, kite fishing also tends to take into consideration the wind conditions that are present and the angle that the boat takes with respect to the wind conditions can be limited. Additionally, when a kite fishing rig is hit by a game fish, the line will tend to slacken requiring additional time for the fisherman to take the slack out of the line prior to setting the hook. Accordingly, there remains a salient need in the sport fishing industry to simplify the techniques that are utilized for attracting and catching line-shy fish.

SUMMARY

The present disclosure satisfies the foregoing needs by providing, inter alia, a hydrofoil fishing lure apparatus that addresses the foregoing deficiencies in prior fishing methodologies.

In one aspect, a hydrofoil fishing lure apparatus is disclosed. In one embodiment, the hydrofoil fishing lure apparatus includes an artificial lure having a body and a hydrofoil that includes a strut and a lifting surface, the strut for the hydrofoil being attached to the body of the artificial lure.

In one variant, the strut is positioned on a front half of the body.

In another variant, the body of the artificial lure further includes a pair of retractable wing-like pectorals and the strut includes a pair of wing retraction elements. The articulation of the pair of wing retraction elements results in articulation of the pair of retractable wing-like pectorals.

In yet another variant, the strut is positioned on a rear half of the body.

In yet another variant, the lifting surface of the hydrofoil fishing lure apparatus stabilizes the body of the artificial lure in a plane that is generally orthogonal to the strut.

In yet another variant, the body of the artificial lure includes a three-dimensional flying fish profile.

In yet another variant, the lifting surface includes a wing-like structure, the wing-like structure having a thicker cross section at a front-edge of the lifting surface positioned towards a front portion of the body of the artificial lure and a thinner cross section at a rear-edge of the lifting surface positioned towards a rear portion of the body of the artificial lure, the thicker cross section being larger in dimension than the thinner cross section.

In yet another variant, the hydrofoil fishing lure apparatus also includes a biasing element, the biasing element causing the hydrofoil fishing lure apparatus to steer either right or left when trolled.

In yet another variant, the biasing element includes one or more vertical protrusions that protrude from an upper surface of the lifting surface and/or a lower surface of the lifting surface.

In yet another variant, the one or more vertical protrusions includes a protrusion that extends from the lower surface of the lifting surface and includes a bend that protrudes either to a left or right side of the body of the artificial lure.

In yet another variant, the biasing element includes the strut, the strut having a thicker cross section at a front-edge of the strut positioned towards a front portion of the body of the artificial lure and a thinner cross section at a rear-edge of the strut positioned towards a rear portion of the body of the artificial lure, the thicker cross section being larger in dimension than the thinner cross section.

In yet another variant, the biasing element includes an uneven weight distribution for the lifting surface.

In yet another variant, the uneven weight distribution is resultant from a number of distinct weights that are either attached to and/or embedded within the lifting surface.

In yet another variant, the lifting surface includes a translucent polymer.

In yet another variant, the translucent polymer has a refractive index from about 1.33 to about 1.35.

In yet another variant, the translucent polymer includes a shaded translucent polymer.

In yet another variant, the hydrofoil fishing lure apparatus includes a hinged joint positioned between the strut and the lifting surface of the hydrofoil.

In yet another variant, the hinged joint is configured to alter an angle of attack for the lifting surface of the hydrofoil.

In yet another variant, the hinged joint is configured to bias the hydrofoil fishing lure apparatus to steer either right or left when trolled.

In yet another variant, the hinged joint enables the lifting surface to rotate in at least two degrees of freedom.

In yet another variant, the hydrofoil fishing lure apparatus includes a hinged joint positioned between the strut and the body of the artificial lure.

Other features and advantages of the present disclosure will immediately be recognized by persons of ordinary skill in the art with reference to the attached drawings and detailed description of exemplary implementations as given below.

BRIEF DESCRIPTION OF THE DRAWINGS

The features, objectives, and advantages of the disclosure will become more apparent from the detailed description set forth below when taken in conjunction with the drawings, wherein.

All Figures disclosed herein are © Copyright 2021-22 Bradley David Cahoon. All rights reserved.

Hydrofoil Fishing Lure Apparatus—

Implementations of the present disclosure will now be described in detail with reference to the drawings, which are provided as illustrative examples so as to enable those skilled in the art to practice the technology. Notably, the figures and examples below are not meant to limit the scope of the present disclosure to a single implementation or implementations, but other implementations are possible by way of interchange of or combination with some or all of the described or illustrated elements. Wherever convenient, the same reference numbers will be used throughout the drawings to refer to same or like parts.

Figure 1A:
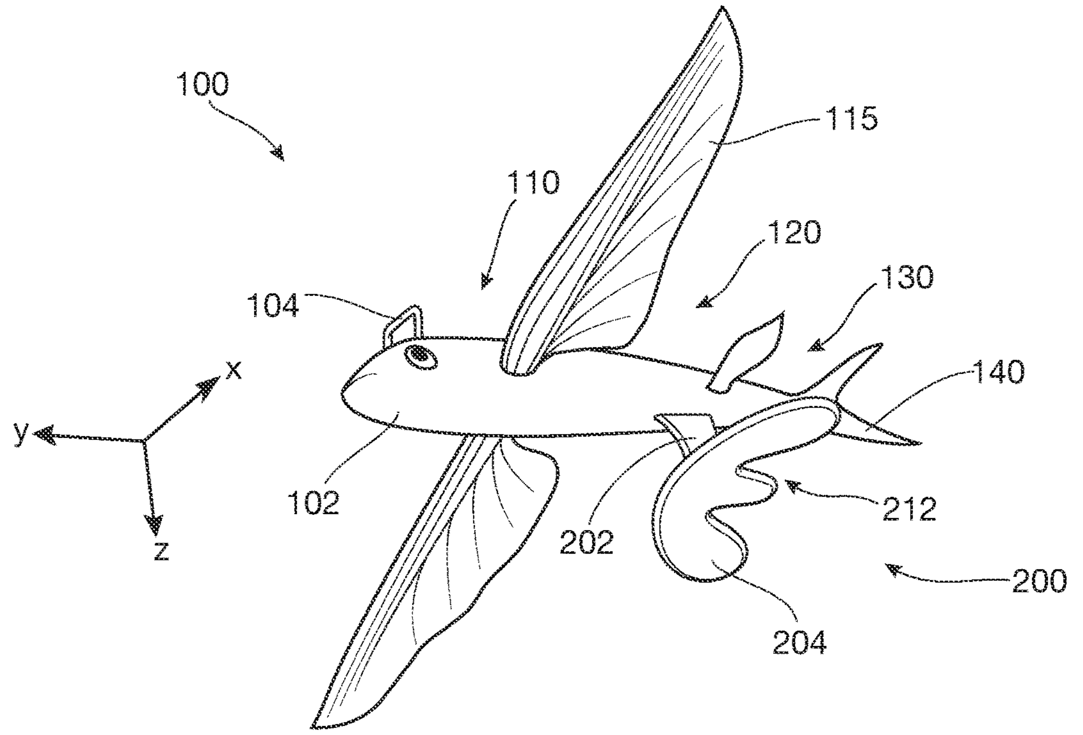
FIG. 1A is a side elevational view of first exemplary hydrofoil fishing lure apparatus, in accordance with the principles of the present disclosure.
Figure 1B:
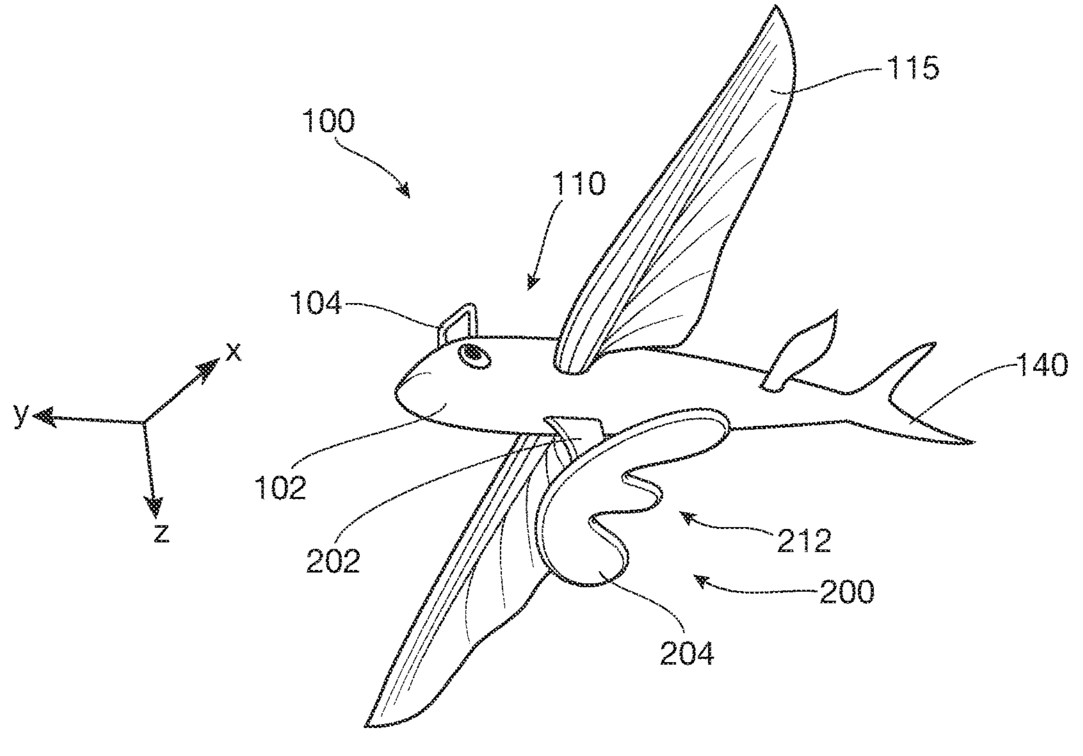
FIG. 1B is a side elevational view of a second exemplary hydrofoil fishing lure apparatus, in accordance with the principles of the present disclosure.

Referring now to FIGS. 1A and 1B, exemplary hydrofoil fishing lure apparatus 100 are shown and described in detail. FIG. 1A illustrates one exemplary hydrofoil fishing lure apparatus 100 where the hydrofoil 200 is positioned toward the rear 130 of the artificial lure 102. The artificial lure 102 may take on any number of colors, shapes and sizes although in one exemplary implementation, the artificial lure 102 may take the form of an exocoetidae, known colloquially as a flying fish or flying cod. Towards the front 110 of the artificial lure 102, the hydrofoil fishing lure apparatus 100 may include an attachment hoop or ring 104. The attachment hoop or ring 104 is configured to receive a leader line which may consist of, for example, a metal leader wire (e.g., stainless steel), a leader line made of braided line, and/or a leader line made from a polymer such as, for example, a fluorocarbon or monofilament fishing line as well as other types of common fishing lines. The leader line may also include one or more hooks for attachment to the artificial lure 102. For example, a J-hook type of fishing hook may be positioned in the middle portion 120 of the artificial lure 102, while a treble hook may be positioned in the rear portion 130 of the artificial lure 102. In some implementations, the hydrofoil fishing lure apparatus 100 may not include any hooks during trolling and may instead be utilized to attract sportfish so that alternative fishing methodologies such as fly-lining live bait, or the casting of artificial lures may be utilized once these sportfish have been spotted. In other words, the hydrofoil fishing lure apparatus 100 may allow a fisherman to see the presence of the sportfish where other fishing techniques may be utilized to capture these spotted sportfish.

In some implementations, breakaway bands may be positioned around the body of the artificial lure 102 to temporarily secure the hooks to the artificial lure 102. A breakaway band may be secured to the attachment hoop or ring 104 to temporarily secure the leader line to the attachment hoop or ring 104. Accordingly, upon the hydrofoil fishing lure apparatus 100 being hit by a targeted game species, the breakaway bands are configured to "snap" allowing the hydrofoil fishing lure apparatus 100 to separate from the hooked fish. The attachment ring or loop 104 may be slidably coupled to the leader line allowing for retrieval of the hydrofoil fishing lure apparatus 100 upon landing of the targeted species. In some implementations, one or more hooks may be embedded within the body of the artificial lure 102 itself. In some implementations, it may be desirable to include a flotation wrap or lifejacket in conjunction with the artificial lure 102 to assist in keeping the artificial lure elevated at or above the water line. In some variants, flotation devices (e.g., air pockets, foam, etc.) may be included within the body of the artificial lure 102 itself.

As shown in FIG. 1A, the hydrofoil 200 is positioned towards the rear portion 130 of the artificial lure 102. The hydrofoil 200 may consist of one or more lifting surfaces 204 that are coupled with the body of the artificial lure 102 via a strut 202. The one or more lifting surfaces 204 may include a wing-like structure. For example, the one or more lifting surfaces 204 may be shaped like a wing with a leading edge (i.e., the edge closer to the front portion 110 of the artificial lure 102) being larger in cross section than the trailing edge (i.e., the edge closer to the rear portion 130 of the artificial lure 102). In some implementations, the one or more lifting surfaces 204 may have a fixed angle of attack with respect to the body of the artificial lure 102. Although the angle of attack may be fixed in some implementations, this fixed angle of attack may vary between different artificial lures 102. For example, a steeper angle of attack may assist with lifting the body of the artificial lure 102 out of the water at slower trolling speeds, while a shallower angle of attack may assist with lifting the body of the artificial lure 102 out of the water at faster trolling speeds. In some implementations, the attachment point between the one or more lifting surfaces 204 and the strut 202 may be allowed to articulate so as to enable the altering of the angle of attack during trolling. This articulation may be achieved through mechanical means in some implementations (e.g., through a pivoting joint, a spring and/or a fastener). In other implementations, this articulation may be achieved through both mechanical and electrical means. For example, an electric motor that is powered through use of, for example, an internal energy source (e.g., a battery) may be utilized to alter angle of attack for the one or more lifting surfaces 204.

Although a single lifting surface 204 is illustrated in the embodiments shown in FIGS. 1A and 1B, it would be appreciated that additional lifting surface(s) 204 may be included as part of the hydrofoil 200 in some implementations. For example, one or more additional lifting surface(s) 204 may be positioned on the strut 202 between the lifting surface 204 illustrated and the body of the artificial lure 102. These one or more additional lifting surface(s) 204 may assist in lifting the artificial lure 102 out of the water through which the hydrofoil fishing lure apparatus 100 is being trolled. In some variants, one or more additional strut(s) 202 may be utilized for attachment to one or more additional lifting surface(s) 204. In yet another variant, lifting surfaces 115 on the body of the artificial lure 102 may be utilized to help lift the hydrofoil fishing lure apparatus 100 above the water line in addition to, or alternatively than, the aforementioned variants and implementations.

One or more additional hooks may be secured to the lifting surface(s) 204 and/or the strut 202 of the hydrofoil 200 and may be temporarily secured using breakaway bands similar to those implementations discussed supra. The hydrofoil 200 may be manufactured from a clear polymer in some implementations to conceal the presence of the hydrofoil 200 from sportfish. For example, the polymer chosen may be selected to have a refraction index that is similar to the refraction index of water (e.g., from a refractive index of about 1.33 to about 1.35). In some implementations, the lifting surface 204 and/or the strut 202 may have a reflective surface which disperses light to mimic the presence of a school of baitfish. In such an implementation, other types of materials may be chosen for the hydrofoil 200 including metals, carbon fiber, reflective coatings on the hydrofoil itself, and other types of suitable materials. In yet another implementation, the hydrofoil 200 (including the lifting surface 204 and/or strut 202) may be manufactured from a translucent material that may be shaded so as to resemble the shadow of the artificial lure 102. In some implementations, combinations of the foregoing materials may be utilized in combination with one another and may be, for example, selectively chosen based on the current conditions in which the hydrofoil fishing lure apparatus 100 is being utilized. For example, the strut 202 may be manufactured from a clear polymer (e.g., having a similar refractive index to the operating conditions of the water) while the lifting surface 204 may be manufactured from a shaded translucent polymer.

In some implementations, the hydrofoil 200 is designed to lift the artificial lure 102 out of the water when trolled to mimic the behavior of baitfish attempting to escape the pursuit of predators. For example, when trolled at an appropriate speed, the hydrofoil fishing lure apparatus 100 will appear to skip along the surface of the water while keeping the leader line out of the water, thereby presenting a more natural presentation to line-shy fish while trolling, without necessarily requiring more complex rigging techniques like the aforementioned kite fishing rigs. The lifting surface 204 of the hydrofoil 200 may also aid in stabilizing the hydrofoil fishing lure apparatus 100 to keep the artificial lure 102 upright throughout the presentation in addition to, or alternatively from, the lift function of the lifting surface 204. For example, and referring to FIGS. 1A and 1B, the hydrofoil 200 may stabilize the artificial lure 102 in the X-Y plane (i.e., to minimize wobble during trolling) regardless of whether or not the lifting surface 204 actually lifts the artificial lure 102 above the water line. FIG. 1B illustrates a variant where the hydrofoil 200 is positioned towards the front portion 110 of the artificial lure 102. Such a variant may be useful for allowing clean strikes of the lure 100 to ensure that the striking fish can be hooked cleanly without the hydrofoil 200 potentially interfering with the hooking of the striking fish. Additionally, as the hydrofoil fishing lure apparatus 100 is being trolled with the fishing line already under tension, less time is needed to take the slack out of the line, if any, to properly set the hook as compared with other methodologies such as the aforementioned kite fishing techniques where the slack needs to be "taken up" prior to the hookset.

While FIG. 1A illustrates the hydrofoil 200 being present towards the rear portion 130 of the artificial lure 102, and FIG. 1B illustrates the hydrofoil 200 being present towards the front portion 110 of the artificial lure 102, it would be readily apparent to one of ordinary skill given the contents of the present disclosure that other variants may include the hydrofoil 200 being positioned towards the middle portion 120 of the artificial lure. For example, in such a variant the underlying profile of the lifting surface 204 may be shaped to mimic the shadow of the artificial lure 102. The hydrofoil 200 may include a polymer that is selected to have a transparent coloring to help mimic the effect of a shadow. The strut 202 for the hydrofoil 200 may be connected with an underlying structural member located within the body of the artificial lure 102 in some implementations. In alternative variants, the top portion of the strut 202 may consist of a sleeve that is configured to be placed around the body of the artificial lure 102 thereby securing the hydrofoil 200 to the artificial lure.

In some implementations, it may be desirable to position the hydrofoil fishing lure apparatus 100 so that the hydrofoil fishing lure apparatus 100 is being trolled outside the wake of the boat that is trolling the lure. In other words, it may be desirable to troll the hydrofoil fishing lure apparatus 100 in undisturbed water outside of the wake of the trolling boat. In such an implementation, it may be accomplished by biasing the hydrofoil 200 so that the hydrofoil fishing lure apparatus 100 wants to pull either to the right of the boat or to the left of the boat while being trolled. In some implementations, fins 140 or other surfaces located on the artificial lure 102 may be used as a rudder to accomplish the biasing of the hydrofoil fishing lure apparatus 100 while being trolled in addition to, or alternatively than, the biasing accomplished through the hydrofoil 200. In some variants, the body of the artificial lure 102 and/or portions of the artificial lure 102 (such as, for example, the rear fin 140) may be manufactured from a soft rubber and/or a pliable plastic material. In such variants, the body of the artificial lure 102 may appear more life-like. For example, the rear fin 140 may articulate back and forth due to, for example, the force of the water being exerted against the rear fin 140 during trolling, thereby allowing the rear fin 140 to behave in a manner similar to the actions of a live fish.

Vertical surfaces (or tabs 206) located on the upper lifting surface 204 and/or the bottom lifting surface 204 of the hydrofoil 200 may accomplish the biasing of the hydrofoil fishing lure apparatus 100. In one implementation, the vertical surface 206 may protrude below the bottom lifting surface 204 by a set dimension (e.g., from between about 0.5 inches and 6 inches) in the Z-direction, followed by a protrusion at an angle to the right (or to the left) at about a forty-five degree angle (45°) (e.g., from about fifteen degrees (15°) to about sixty degrees (60°)) in the X-direction. In this implementation, the angled vertical protrusion may assist in biasing the hydrofoil fishing lure apparatus 100 outside of the wake caused by the trolling boat. In some implementations, the aforementioned vertical surface 206 with the angled protrusion may also be weighted. In such an implementation, a biasing bar for connection to the leader line may be included that protrudes in the X-direction. For example, the biasing bar may protrude in the same general direction as the angled protrusion. This biasing bar may serve as a connection point for the leader line such that the leader line is connected to the hydrofoil fishing lure apparatus 100 offset from the center line. Such an implementation may be desirable to assist in biasing the hydrofoil fishing lure apparatus 100 outside of the wake caused by the trolling boat and may, or may not, be used in conjunction with the lifting surface 204.

In some implementations, the strut 202 may be shaped to provide for the biasing of the hydrofoil fishing lure apparatus 100. For example, the strut 202 may be shaped like a wing with a leading edge (i.e., the edge closer to the front portion 110 of the artificial lure 102) being larger in cross section than the trailing edge (i.e., the edge closer to the rear portion 130 of the artificial lure 102). The strut 202 may then be positioned (or rotated) so that the hydrofoil fishing lure apparatus 100 either pulls to the left or pulls to the right when being trolled. This ability to be positioned (or rotated) may be fixed, or may be adjustable using, for example, a joint and set screw. These and other variants or combinations of the foregoing may be utilized to bias the hydrofoil fishing lure apparatus 100 in some implementations.

A hinge mechanism placed at the intersection of the artificial lure 102 and the strut 202 and/or a hinge mechanism placed at the intersection of the strut 202 and the lifting surface 204 may be utilized to keep the body of the artificial lure 102 in a desired orientation (e.g., parallel with the direction of movement of the boat) while the hydrofoil fishing lure apparatus 100 is biased to either the left or the right of the trolling boats wake. These hinge mechanisms may enable one degree of freedom of movement (e.g., around a yaw axis), two degrees of freedom of movement (e.g., around a yaw axis and/or a roll axis), or three degrees of freedom of movement (e.g., around a yaw axis, a roll axis, and/or a pitch axis) depending upon the particular hinge mechanism chosen for the hydrofoil fishing lure apparatus 100. For example, a three degree of freedom hinge mechanism may consist of a ball and socket type joint. The socket joint may be loosened to enable movement about the ball joint. The socket joint may then be tightened in order to prevent further rotation. Combinations of the aforementioned examples (e.g., around a roll axis and a pitch axis, as but one non-limiting example) may also be readily implemented given the contents of the present disclosure.

In some implementations, the weighting of the one or more lifting surfaces 204 may be altered throughout the body of the one or more lifting surfaces 204 as opposed to a lifting surface 204 that may be homogenously weighted throughout. One purpose for the altering the weighting of the one or more lifting surfaces 204 may be to affect the biasing of the hydrofoil fishing lure apparatus 100 so that the hydrofoil fishing lure apparatus 100 may pull to the left (or to the right) so that the hydrofoil fishing lure apparatus 100 may be trolled outside of the wake of the trolling boat. In some implementations, multiple ones of the hydrofoil fishing lure apparatus 100 (e.g., two or more hydrofoil fishing lure apparatus 100) may be daisy-chained together to mimic a school of baitfish. In other words, the mimicking of a school of baitfish may enable additional opportunities for a given hydrofoil fishing lure apparatus 100 to be struck by a targeted sportfish. These daisy-chained hydrofoil fishing lure apparatus 100 may include various one of the features described herein.

Figure 2A:
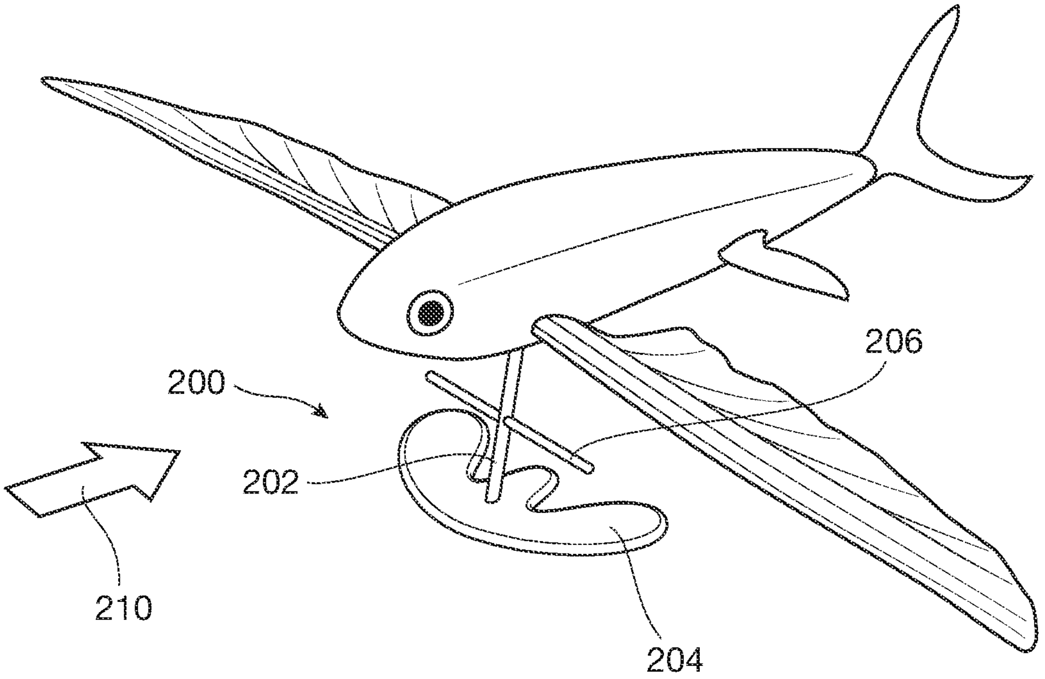
FIG. 2A is a top-down view of an exemplary hydrofoil for use with the hydrofoil fishing lure apparatus of FIGS. 1A and 1B with the wing retraction mechanism shown in a first position, in accordance with the principles of the present disclosure.
Figure 2B:
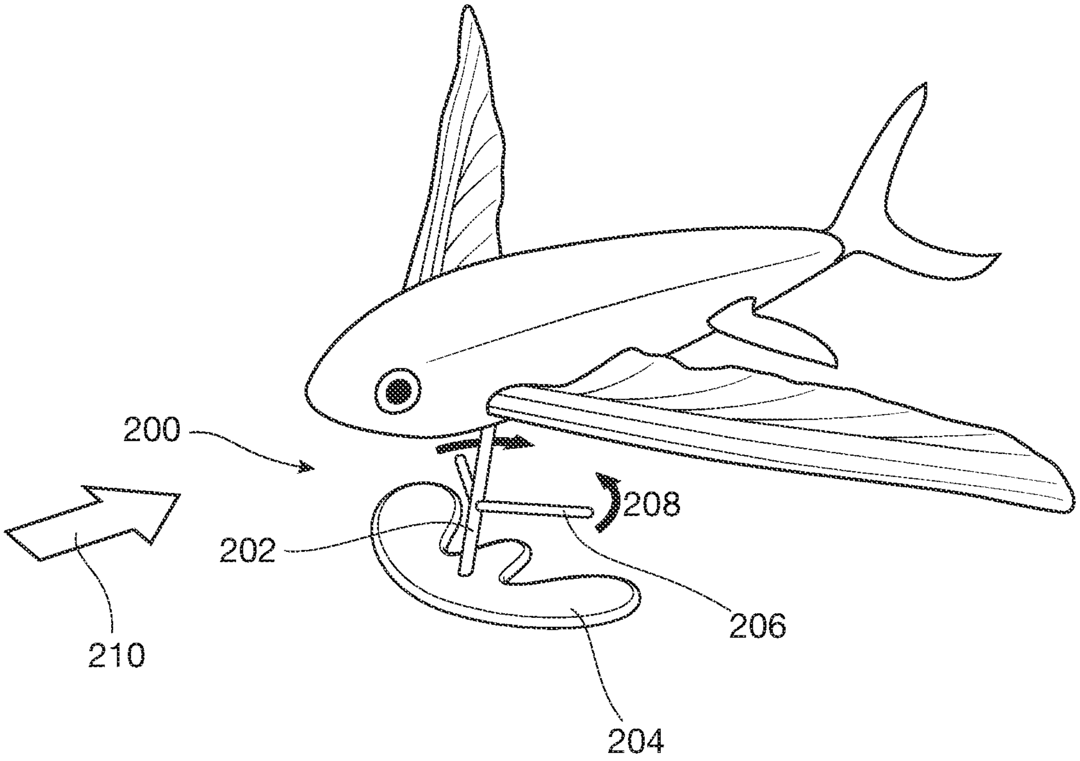
FIG. 2B is a top-down view of the exemplary hydrofoil shown in FIG. 2A, but showing the wing retraction mechanism in a second position, in accordance with the principles of the present disclosure.

Referring now to FIGS. 2A and 2B, perspective views of an exemplary hydrofoil 200 for use with the hydrofoil fishing lure apparatus 100 of FIGS. 1A and 1B are shown and described in detail. As illustrated in FIGS. 2A and 2B, the outer profile of the lifting surface 204 is W-shaped in profile, although it would be appreciated that alternative implementations may include a wing-like shape, a V-shaped profile, a circular profile, ovular in profile or other hydrodynamic shapes in some variants. In the embodiment illustrated in FIGS. 2A and 2B, the hydrofoil 200 may include a pair of wing retraction elements 212 that are positioned on the strut 202 between the lifting surface 204 of the hydrofoil 200 and the body of the artificial lure 102. When the pair of wing retraction elements 212 are above the water line, they may remain in a resting position (e.g., shown as being parallel with one another in FIG. 2A). When the pair of wing retraction elements 212 are below the water line, the force of the moving water 210 may cause the pair of wing retraction elements 212 to rotate in a direction 208 as illustrated in FIG. 2B. The rotation of the wing retraction elements 212 may cause the fins 115 of the artificial lure 102 to retract closer to the body of the artificial lure 102. When the wing retraction elements 212 are in a resting position as shown in FIG. 2A, the fins 115 of the artificial lure 102 will spread out thereby mimicking the behavior of a flying fish.

Figure 3:
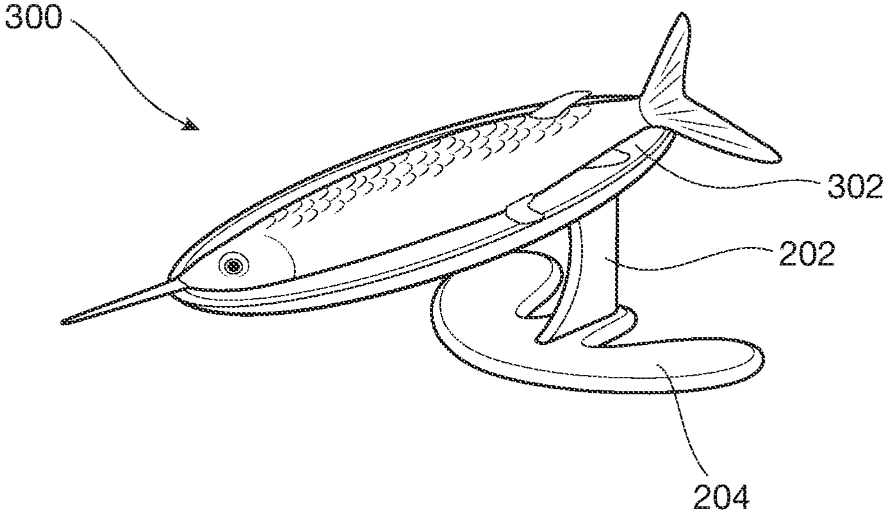
FIG. 3 is a side elevational view of a third exemplary hydrofoil fishing lure apparatus for use with frozen, live, or artificial baits, in accordance with the principles of the present disclosure.

Referring now to FIG. 3, a variant of the hydrofoil fishing lure apparatus 300 for use with frozen, live, or artificial baits is shown and described in detail. In some implementations, the hydrofoil fishing lure apparatus 300 may include some or all of the features described with reference to FIGS. 1A-2B. However, the hydrofoil fishing lure apparatus 300 may include a platform 302 upon which the bait may be mounted. In some implementations, the platform 302 may be configured to mount to, for example, the underside of a baitfish, to the sides of a baitfish, and/or the top side of a baitfish. Such variant of the hydrofoil fishing lure apparatus 300 may be beneficial given the habits of a particular targeted game species. For example, by using frozen or live bait, the targeted game species may be less likely to want to spit out the bait after the strike.

It will be recognized that while certain aspects of the present disclosure are described in terms of specific design examples, these descriptions are only illustrative of the broader methods of the disclosure and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

What is claimed is:

1. A hydrofoil fishing lure apparatus, comprising:

an artificial lure having a body, the body taking a form that resembles an exocoetidae, the body comprising a pair of wing-like pectorals, a head, and a caudal fin, the body being configured to receive one or more hooks; and a hydrofoil that comprises a strut and a lifting surface, the strut and the lifting surface being positioned underneath the body of the artificial lure, the lifting surface lifting at least a portion of the body out of water when the hydrofoil fishing lure apparatus is being trolled, the strut for the hydrofoil being attached to the body of the artificial lure that takes the form that resembles the exocoetidae, wherein the hydrofoil enables the hydrofoil fishing lure apparatus to be fished without using a kite;

wherein the lifting surface of the hydrofoil comprises a wing-like structure, the wing-like structure comprising a thicker cross section at a front-edge portion of the lifting surface positioned towards a front portion of the body of the artificial lure and a thinner cross section at a rear-edge portion of the lifting surface positioned towards a rear portion of the body of the artificial lure, the thicker cross section being larger in dimension than the thinner cross section.

2. The hydrofoil fishing lure apparatus of claim 1, wherein the strut is positioned on a front half of the body.

3. The hydrofoil fishing lure apparatus of claim 1, wherein the lifting surface of the hydrofoil fishing lure apparatus stabilizes the body of the artificial lure in a plane that is generally orthogonal to the strut.

4. The hydrofoil fishing lure apparatus of claim 1, further comprising a biasing element, the biasing element causing the hydrofoil fishing lure apparatus to steer either right or left when trolled.

5. The hydrofoil fishing lure apparatus of claim 4, wherein the biasing element comprises one or more vertical protrusions that protrude from an upper surface of the lifting surface and/or a lower surface of the lifting surface.

6. The hydrofoil fishing lure apparatus of claim 5, wherein the one or more vertical protrusions comprises a protrusion that extends from the lower surface of the lifting surface and includes a bend that protrudes either to a left or right side of the body of the artificial lure.

7. The hydrofoil fishing lure apparatus of claim 4, wherein the biasing element comprises the strut, the strut comprising a thicker cross section at a front-edge portion of the strut positioned towards a front portion of the body of the artificial lure and a thinner cross section at a rear-edge portion of the strut positioned towards a rear portion of the body of the artificial lure, the thicker cross section being larger in dimension than the thinner cross section.

8. The hydrofoil fishing lure apparatus of claim 4, wherein the biasing element comprises an uneven weight distribution for the lifting surface.

9. The hydrofoil fishing lure apparatus of claim 8, wherein the uneven weight distribution is resultant from a plurality of distinct weights that are either attached to and/or embedded within the lifting surface.

10. The hydrofoil fishing lure apparatus of claim 1, wherein the lifting surface comprises a translucent polymer.

11. The hydrofoil fishing lure apparatus of claim 10, wherein the translucent polymer comprises a refractive index from about 1.33 to about 1.35.

12. The hydrofoil fishing lure apparatus of claim 10, wherein the translucent polymer comprises a shaded translucent polymer.

13. The hydrofoil fishing lure apparatus of claim 1, further comprising a hinged joint positioned between the strut and the lifting surface of the hydrofoil.

14. The hydrofoil fishing lure apparatus of claim 13, wherein the hinged joint is configured to alter an angle of attack for the lifting surface of the hydrofoil.

15. The hydrofoil fishing lure apparatus of claim 13, wherein the hinged joint is configured to bias the hydrofoil fishing lure apparatus to steer either right or left when trolled.

16. The hydrofoil fishing lure apparatus of claim 13, wherein the hinged joint enables the lifting surface to rotate in at least two degrees of freedom.

17. The hydrofoil fishing lure apparatus of claim 1, further comprising a hinged joint positioned between the strut and the body of the artificial lure.

* * * * *